United States Patent [19]

Blasko

[11] Patent Number: 5,153,821
[45] Date of Patent: Oct. 6, 1992

[54] PULSE-WIDTH-MODULATION METHOD FOR PROVIDING EXTENDED LINEARITY, REDUCED COMMUTATION LOSSES AND INCREASE IN INVERTER/CONVERTER OUTPUT VOLTAGE

[75] Inventor: Vladimir Blasko, Newington, Conn.

[73] Assignee: Otis Elevator Company, Farmington, Conn.

[21] Appl. No.: 755,920

[22] Filed: Sep. 6, 1991

[51] Int. Cl.[5] .......................................... H02M 7/537
[52] U.S. Cl. ...................................... 363/41; 363/98; 318/811
[58] Field of Search ...................... 363/41, 98; 318/811

[56] References Cited

U.S. PATENT DOCUMENTS 4,364,109 12/1982 Okado et al. .......................... 363/41
4,951,187 8/1990 Stemmler ........................... 363/41 X
4,994,951 2/1991 Iwasa et al. ........................... 363/41

Primary Examiner—Emanual T. Voeltz
Attorney, Agent, or Firm—Breffni X. Baggot

[57] ABSTRACT

A voltage conversion device, whether for inversion, or conversion includes a pulse-width-modulator and a three-phase bridge, each leg of the bridge has a pair of complementary switches (S1/S1*, S2/S2*, S3/S3*). One of the switches S1, S2 or S3 (S1*, S2* or S3*) conducts in those time intervals where the associated reference voltage $U_A$ $U_B$ or $U_C$ has a higher (smaller) amplitude than the other two reference voltages. According to the present invention, (a) three reference voltages are supplied, (b) the maximum of these voltages is detected, (c) the maximum is subtracted from the peak value of a triangle wave used for forming the PWM signal, and (d) the difference is added to each of the reference voltages to form augmented reference voltages supplying a PWM. The result is that when one of the three reference voltages is greater than the other two, a switch of one of the three complementary pairs of such switches in the bridge conducts, while in each of the other two complementary pairs, both switches open and close in response to the PWM signal such that only two currents are independently controlled by each of the two complementary pairs which are allowed to open and close, and the third current, associated with the complementing pair which is not allowed to switch, is controlled by the other two.

6 Claims, 8 Drawing Sheets

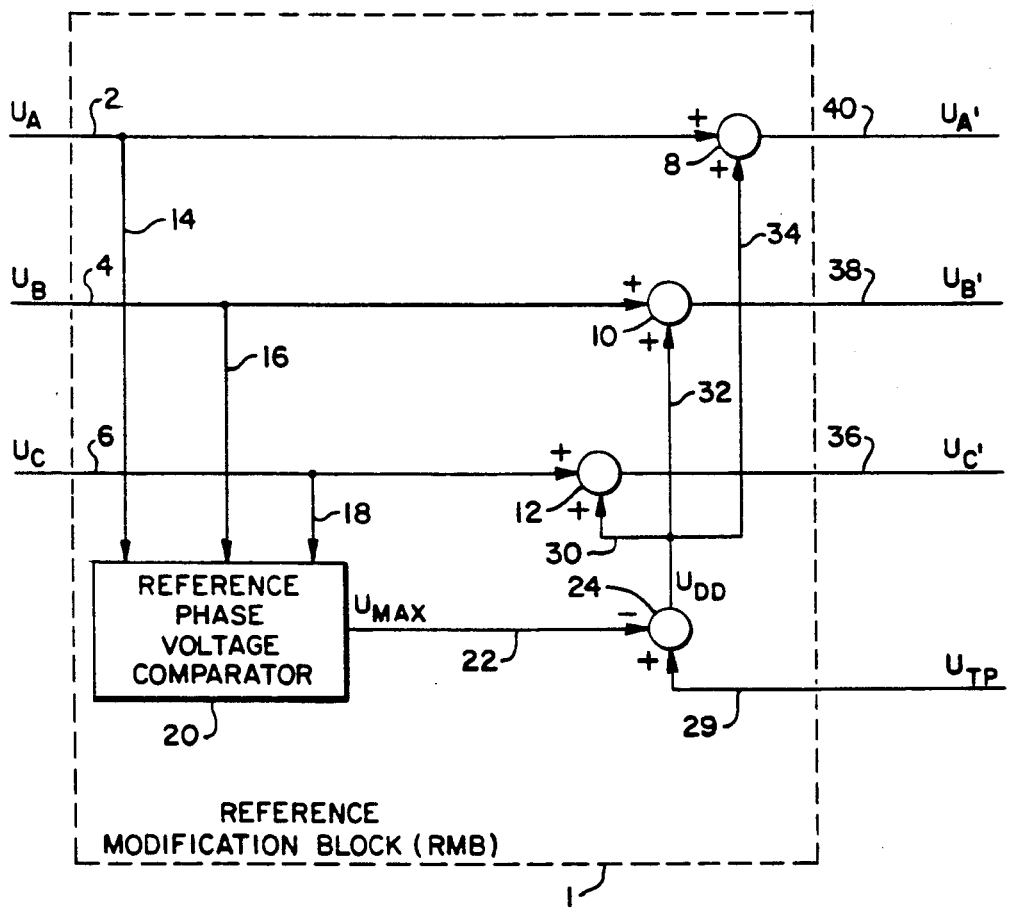
FIG. IA

PULSE-WIDTH-MODULATION METHOD FOR PROVIDING EXTENDED LINEARITY, REDUCED COMMUTATION LOSSES AND INCREASE IN INVERTER/CONVERTER OUTPUT VOLTAGE

TECHNICAL FIELD

This invention relates to PWM voltage conversion.

BACKGROUND OF THE INVENTION

In one and three-phase voltage source inverters and converters, alternating voltage is generated usually from a constant DC bus voltage by switching on and off semiconductor switches in a bridge according to a PWM technique. The PWM technique which is very often used is based on the comparison of a triangular voltage with fixed frequency and a reference voltage with fixed or variable frequency (triangle comparison method).

A single-phase PWM converter consists of a PWM circuit (with control electronics), a semiconductor bridge, an AC voltage source in series with an inductor, and a load on the DC side. Because the load in a voltage source inverter (VSI) can be substituted with an inductor in series with an AC voltage source, the circuit topology for a VSI applies equally well for a voltage source converter (VSC). A single-phase PWM circuit typically consists of a triangle signal generator, a summer, and a comparator. The triangle signal generator produces a triangle signal $U_T$ having a carrier frequency $f_c$, the peak values of the triangle being $+U_{TP}$ and $-U_{TP}$. $U_T$ is subtracted from a reference phase voltage $U_A$, in the summer, producing an error signal $E_{A'}$, which is provided to the comparator. In response, the comparator produces a switching signal $U_{SA'}$ that controls two complementary switches S1, S1*.

The bridge circuit, which receives the PWM signals for controlling S1 and S1*, consists of two circuits having the load in common. One circuit consists of a switching assembly, including a switch S1 and a freewheeling diode shunting that switch, a DC power supply having a voltage Udc/2, and a third element, the load. The second loop consists of a second switching assembly, including a switch S1* responsive to a NOT gate and a freewheeling diode shunting the switch, a second DC power supply having a voltage Udc/2, and a third element, the load. The two circuits apply a voltage of magnitude Udc/2 across the load $Z_{A'}$. When S1 is closed, the polarity of the voltage is opposite the polarity when S1* is closed. If $E_{A'} > 0$ or $U_{A'} > U_T$, the output $U_{SA'}$ of the comparator assumes a value equal to 1. The first switch S1 is now closed and the second S* opened. The voltage $U_{A'O}$ across the load, between the line midpoint and the supply midpoint, is Udc/2. On the other hand, if $E_{A'} < 0$, or $U_{A'} = U_T$, the output $U_{SA'}$ of the comparator is zero. The switch S1* is now closed and the first switch S1 is opened. A negative voltage $U_{A'O} = -Udc/2$ is applied across the load $Z_{A'}$.

When $U_{A'}$ is positive, over a period $1/f_c$, the switching voltage $U_{SA'}$ is equal to 1 for a time longer than it is equal to 0, and so S1 is closed more of the time and S1* less of the time; the average value of load voltage $U_{A'O}$ is positive. When $U_{A'}$ is 0, $U_{SA'}$ (over a period $1/f_c$) is 1 for the same amount of time as it is 0, S1 is closed for the same amount of time as it is open, and S1* is correspondingly open for the same amount of time as it is closed; the average load voltage $U_{A'O}$ is 0. When $U_{A'}$ is a negative, $U_{SA'}$ (over a period $1/f_c$) is 0 for a time longer than it is 1, and S1* is closed more of the time than S1; the average load voltage is negative.

If the carrier frequency $f_c$ is much higher than the frequency $f_R$ of the reference signal $U_{A'}$, the locally averaged supply phase voltage across the load mostly follows the reference phase voltage $U_{A'}$. An amplitude modulation index $m_A$ is defined as a ratio of the peak value of sinusoidal reference voltage $U_{A'}$ and peak value $U_{TP}$ of the triangular voltage $U_T$. The average load voltage within each period of the triangle wave is a locally averaged voltage $U_{AOLAVR}$ and tracks $U_{A'}$ so long as the magnitude of $U_{A'}$ is less than $U_{TP}$. To the extent that the locally averaged voltage $U_{AOLAVR}$ tracks $U_{A'}$, the inverter output is a linear function of its input $U_{A'}$. The peak value of $U_{AOLAVR} = m_A * Udc/2$ as long as the modulation index $m_A$ is smaller than 1. For a modulation index $m_A$ equal to 1, the maximum locally averaged voltage $U_{AOLAVR}$ is applied to the load, and the saturation limit of the PWM circuit is reached. Accordingly, $m_A \leq 1$ provides a linear system while $m_A > 1$ provides a non-linear system. Stated differently, the locally averaged voltage $U_{AOLAVR}$ follows $U_{A'}$, so long as $|U_{TP}|$ is $\geq |U_{A'}|$. Further increase in the reference voltage $U_{A'}$ is not followed by a proportional increase of the load voltage $U_{A'O}$.

The analysis for a three-phase inverter is similar because it is simply the sum of three single-phase inverters.

For a three-phase system, the line voltage $U_L$ is $U_P * \sqrt{3}$ times bigger the phase voltage $U_P$. For a PWM inverter/converter with a triangular PWM technique, the peak value of the phase voltage that can be achieved is $U_P = Udc/2$, and therefore the peak line-to-line voltage, is equal to $(Udc/2) * \sqrt{3}$.

The three-phase PWM inverter has problems. First, in the three-phase bridge, the peak value that the line voltage can reach is $U_{DC}$. This is 15.4% higher than $(Udc/2) * \sqrt{3}$, the value that can be reached by the triangle comparison method. The possibility of increasing phase voltages by 15.4% without saturation, by applying different modulation techniques, is clear. For an inverter, this means a 15.4% increase in output voltage. For a converter this means a 15.4% increase in the allowed input voltage. Second, saturation of the PWM circuit causes a reduction of gain in the voltage/current control loops using the PWM and deterioration of the dynamic characteristics of the inverter. Third, the PWM circuit produces commutation losses in proportion to the high carrier frequency $f_c$.

One method of providing both extended voltage range and reduced commutation losses is reported by Malesani, L. and Tenti, P., et al., "Improved Current Control Technique of VSI PWM Inverters with Constant Modulation Frequency and Extended Voltage Range", *IEEE-IAS*. Conference Record of the 1988 IEEE Industry Applications Society Annual Meeting 23rd. This method modifies conventional hysteresis current regulators. A hysteresis current regulator compares a current fed back from a phase current and provides a current error signal to a hysteresis comparator which provides PWM signals to complementary switches in a leg of a bridge. Malesani, L., et al., modifies conventional three-phase hysteresis to achieve an approximately 15% increase in inverter output voltage and regulates to reduce commutation losses, by a factor of one-third, by performing modulations on only two inverter legs at a time, while the third stands at the positive or negative pole of the supply voltage. Phase current error beyond a hysteresis band is the index for determining which leg will stand.

Hysteresis regulators are not suitable for microprocessor software implementation because they require fast comparators which must change state in response to the controlled variables independently of the sampling intervals of the microprocessor. Hysteresis regulators are normally implemented in hardware.

SUMMARY OF THE INVENTION

In an inverter power conversion bridge, the invention recognizes that in linear operation of the triangle PWM method where the amplitude modulation index $m_A$ is smaller than 1, the maximum line-to-line voltage $U_L$ is equal to $(Udc/2) * \sqrt{3}$, although the peak voltage across the bridge is $U_{DC}$. $U_{DC}$ is 15.4% larger than $(Udc/2) * \sqrt{3}$. The invention also recognizes that in the three-phase balanced system, $I_A+I_B+I_C=0$; only two currents are independent, and the third can be controlled by controlling the other two. Given these two propositions, there are therefore time intervals when one of the pairs of complementary switches S1/S1*, S2/S2*, or S3/S3* can be kept closed or open, and all three currents will be controlled by two other pairs of complementary switches in active legs of the bridge, by controlling only two currents.

According to the present invention, in a three-phase bridge having one of three reference phase voltages $U_A$, $U_B$, $U_C$ associated with each leg, one of the switches S1, S2 or S3 (or alternatively their complements S1*, S2* or S3*) conducts in the time intervals where the associated voltage $U_A$, $U_B$ or $U_C$ has a higher (or alternatively, smaller) amplitude than the other two reference voltages. According to the present invention, (a) three reference voltages are supplied, (b) the maximum of these voltages is detected, (c) the maximum is subtracted from the peak value of a triangle wave used for forming the PWM signal, and (d) the difference is added to each of the reference voltages to form a new set of reference voltages for supplying the PWM section, which in turn supplies PWM signals to a three-phase bridge to turn the switches on (closed) and off (open). The result is that when one of the three reference voltages is greater than the other two, a switch in one of the three complementary pairs of switches in the bridge conducts, while in each of the other two complementary pairs, both switches open and close in response to the PWM signal such that only two currents are independently controlled by each of the two complementary pairs which are allowed to open and close, and the third current, associated with the complementing pair which is not allowed to switch, is controlled by the other two. Keeping one switch in each leg closed for one-third of the period of the reference voltage allows control of all three load currents to be dictated by the switching in only two legs of the bridge. This method has several advantages.

First, this method increases the bridge output voltage, and therefore the power, by 15.4% without distortion of the phase voltages, the load midpoint voltage (point 0', FIG. 1) being different from the midpoint of the supply voltage (point 0, FIG. 1). Second, because the output voltage has increased 15.4% without distortion, the linear range of operation of the inverter is extended. Consequently, the reduction in gain in the control loops and deterioration of dynamics which accompany saturation of the PWM at $m_A=1.0$ are not encountered until $m_A=1.154$. Third, since one leg of the bridge constantly conducts and therefore does not commutate for one-third of the period of the reference voltage, losses accompanying commutation are reduced by one-third. Finally, it can be readily implemented in hardware or software.

It is a first object of the invention to extend the linear operation of a three-phase, three-legged PWM power conversion bridge by making a 15.4% increase in the line-to-neutral voltage $U_{AO}$ at which distortion occurs. This is accomplished by augmenting all three phase voltages applied to the PWM by the difference between a constant voltage and the greatest of the three phase voltages such that while a phase voltage is greatest, a switch in the leg associated with the greatest voltage is kept closed. With one switch in a leg closed for 120°, all three load currents are controlled by the closing and opening of the switches in the other two legs, and the voltage across the bridge equals $U_{DC}$, rather than $U_{DC} * \sqrt{3}/2$, as in the conventional triangle comparison method.

It is a second object to reduce commutation losses by one-third.

It is a third object to increase PWM power conversion bridge output voltage and power by 15.4%.

Without the present invention, to get a 15.4% increase in power requires a 15.4% increase in input current that requires more expensive semiconductor switches capable of handling increased current requirements. This current increase thus results in increased losses.

BRIEF DESCRIPTION OF THE DRAWINGS

FIGS. 2 and 3 are on a common time line and $m_A$ is less than 1;

FIGS. 4 and 5 are on a common time line and $m_A$ is greater than 1;

DETAILED DESCRIPTION OF THE INVENTION

Figure 1B:
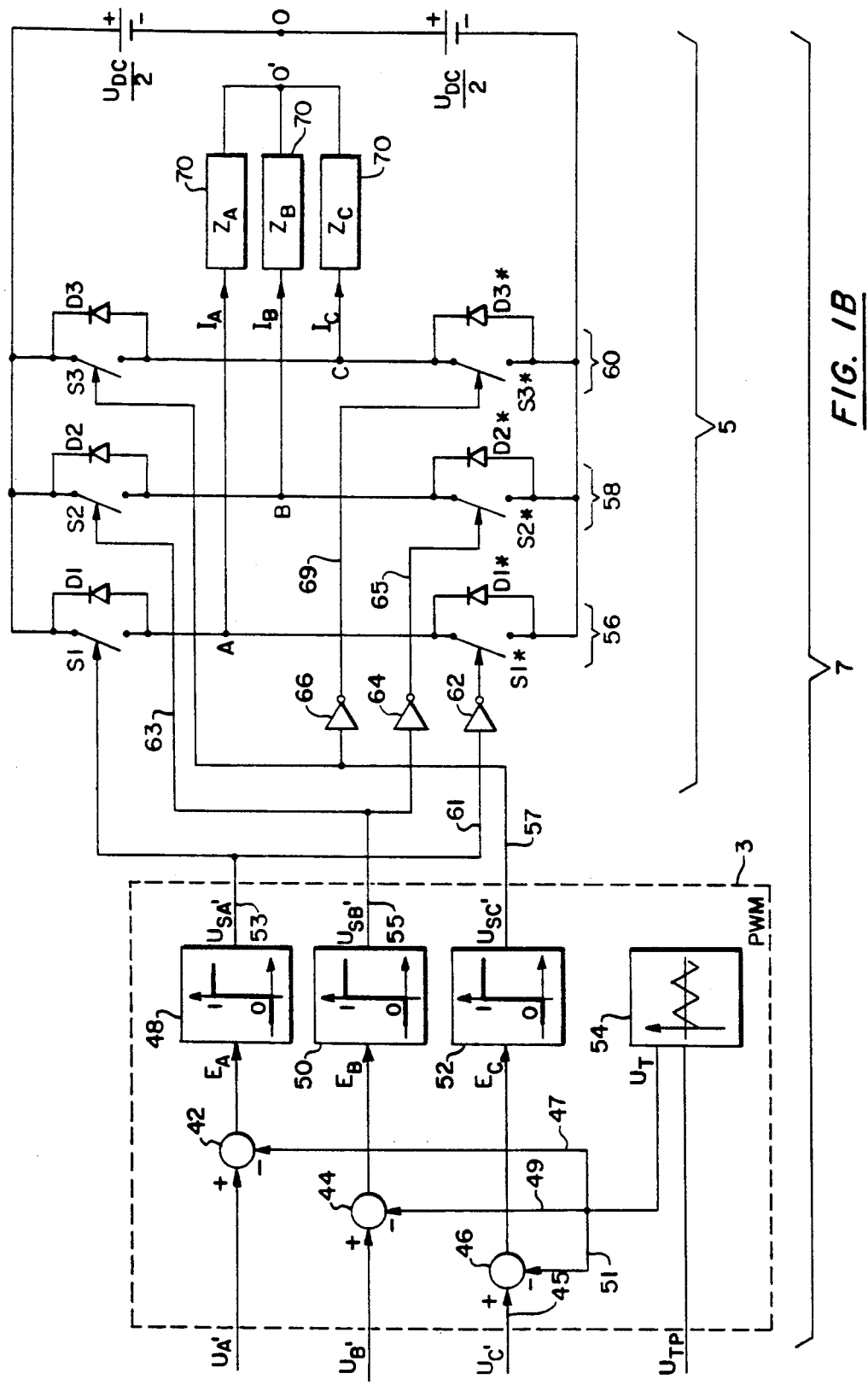
FIGS. 1(a) and (b) are block diagrams representation of a circuit for implementing the present invention in a voltage source inverter.

FIG. 1 shows a circuit for implementing the invention. It includes a reference modification block (RMB) 1, a pulse-width-modulator 3, and a semiconductor bridge 5. The bridge 5 may be for inversion, DC to AC, or conversion, AC to DC. RMB 1 is responsive to three sinusoidal reference phase voltages $U_A U_B U_C$, a triangle voltage $U_T$, and produces three augmented reference phase voltages $U_{A'} U_{B'} U_{C'}$. $U_A U_B$ and $U_C$ are control signals; power in the inverter is obtained from two DC voltage sources Udc/2. The three reference phase voltages $U_A U_B U_C$ are spaced 120° apart. The augmented reference phase voltages are spaced 120° apart. RMB 1 includes three summers 8, 10, 12, a reference phase voltage comparator 20, and a fourth summer 24 responsive to the positive peak magnitude $U_{TP}$ of a triangle signal $U_T$. The negative peak magnitude of the triangle signal $U_T$ is $-U_{TP}$. The three reference phase voltages $U_A$, $U_B$, $U_C$ are provided to RMB 1 and on lines 2, 4, 6 to summers 8, 10, 12. The reference phase signals $U_A U_B U_C$ are provided to a reference phase voltage comparator 20. In the reference phase voltage comparator 20, the magnitudes of each phase voltage $U_A U_B U_C$ are compared and the greatest, $U_{MAX}$, is produced on a line 22 to a summer 24.

In FIG. 1, a constant voltage triangle peak value $U_{TP}$ of triangle signal $U_T$ is produced in PWM 3 and provided on line 29 to summer 24. In summer 24, the greatest voltage, $U_{MAX}$, produced by the reference phase voltage comparator 20 on line 22, is subtracted from the triangle peak signal $U_{TP}$, and the difference $U_{DD}$ provided on lines 30, 32, 34 to summers 8, 10, 12. At the summers 8, 10, 12, the difference signal $U_{DD}$ is added to each of the reference signals $U_A U_B U_C$, thus providing on lines 36, 38, 40 augmented reference signals $U_{A'} U_{B'} U_{C'}$ to PWM 3. The signal added to $U_{MAX}$ may be any constant signal $U_{BIAS}$, but $U_{TP}$ is used here.

In FIG. 1, PWM 3 contains three summers 42, 44, 46, three comparators 48, 50, 52, and a triangle signal generator 54. Each of the summers 42, 44, and 46 is responsive to the augmented reference phase voltages $U_{A'} U_{B'} U_{C'}$ on lines 36, 38, 40 and the triangle signal $U_T$ provided by the triangle signal generator 54 onto lines 47, 49, 51. The triangle signal generator 54 also provides $U_{TP}$ on line 29. The triangle signal $U_T$ has an amplitude of $|U_{TP}|$ and is therefore bounded by $+U_{TP}$ and $-U_{TP}$. The summers 42, 44, 46 provide error signals $E_A E_B E_C$ to comparators 48, 50, 52. If $U_X$ (X is A, B, and C) is greater than $U_T$, the output of the associated comparator 48, 50, or 52 assumes a value $U_{SX}=1$. Thus, the comparators 48, 50, 52 produce switch signals $U_{SA} U_{SB} U_{SC}$ and provide them to the bridge 5. Bridge 5 includes three legs 56, 58, and 60.

In FIG. 1, each leg includes two complementary semiconductor switch assemblies. The first leg includes a switch S1, a freewheeling diode D1 shunting that switch, and a complementary switching assembly—a NOT gate 62, a switch S1*, and a freewheeling diode D1* shunting that switch. The second leg 58 includes a switch S2, a freewheeling diode D2 shunting that switch, and a complementary switching assembly—a switch S2*, a NOT gate 64, and a freewheeling diode D2 shunting that switch. The third leg 60 includes a switch S3, a freewheeling diode D3 shunting that switch, and a complementary switching assembly—a switch S3*, a NOT gate 66, and a freewheeling diode D3* shunting that switch.

The first, second, and third legs 56, 58, 60 of the bridge 5 are responsive to the switch signals $U_{SA'} U_{SB'} U_{SC'}$ provided on lines 53, 55, 57. For example, if $E_A$ is greater than zero or $U_A$ is greater than $U_T$, the output of comparator 48 assumes a value $U_{SA'}=1$. Switch S1 is closed and S1* is opened.

Figure 2:
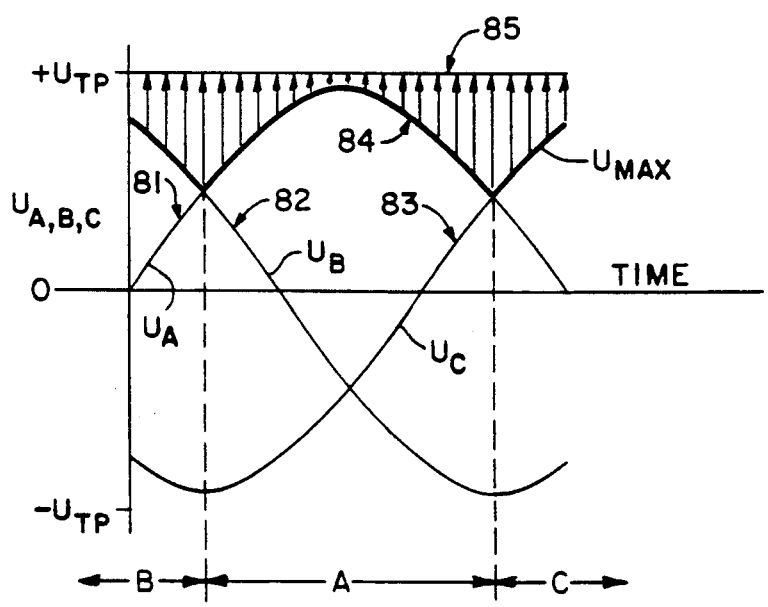
FIG. 2 is a voltage v. time graph of a three-phase sinusoidal voltage, $U_{ABC}$. The amplitude modulation index $m_A$ is less than 1.
Figure 3:
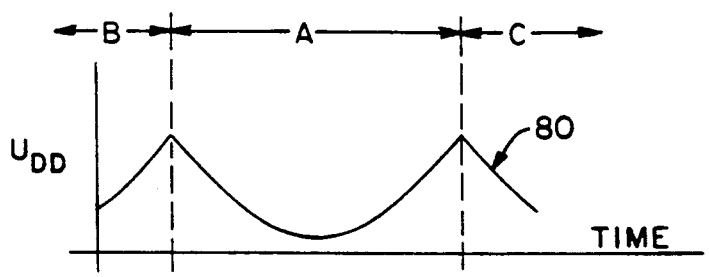
FIG. 3 is a voltage v. time graph of a difference signal, $U_{DD}$.

For $m_A < 1$, the inputs $U_A U_B U_C$ to the RMB 1 as well as to the reference phase voltage comparator 20 ($U_A U_B U_C$) are shown in FIG. 2. The uppermost portion of FIG. 2, the maximum of $U_A U_B$ and $U_C$, is shown in bold as $U_{MAX}$. The triangle peak signal $U_{TP}$, provided on line 29 by the triangle generator 54 in the PWM 3, is shown. FIGS. 2 and 3 are on a common time line and are divided into three sections "A", "B", "C".

The difference signal $U_{DD}$, produced by the summer 24 and equal to the difference between $U_{TP}$ and $U_{MAX}$, is shown in FIG. 3. $U_{DD}$ causes Uo'o to vary. Uo'o is the potential difference between the load midpoint o' and the supply midpoint o. The importance of recognizing this is seeing that the invention, because of $U_{DD}$, increases the locally averaged load phase voltage $U_{AO'LAVR}$ by 15.4% and, at the same time, allows distortion in the locally averaged voltage $U_{AOLAVR}$ between line and supply midpoint (point 0 in FIG. 1), but removes distortion from the locally averaged phase load voltage $U_{AO'LAVR}$ between the line and the load midpoint. For an inverter, the supply is the DC buss voltage $U_{DC}$. In other words, for the 15.4% increased voltage range, distortion is transferred from where it matters, the load, to where it does not matter, $U_{AO}$. Without the RMB 1, $U_{AO}=U_{AO'}$, but with the RMB 1, they differ in proportion to $U_{DD}$.

Figure 6:
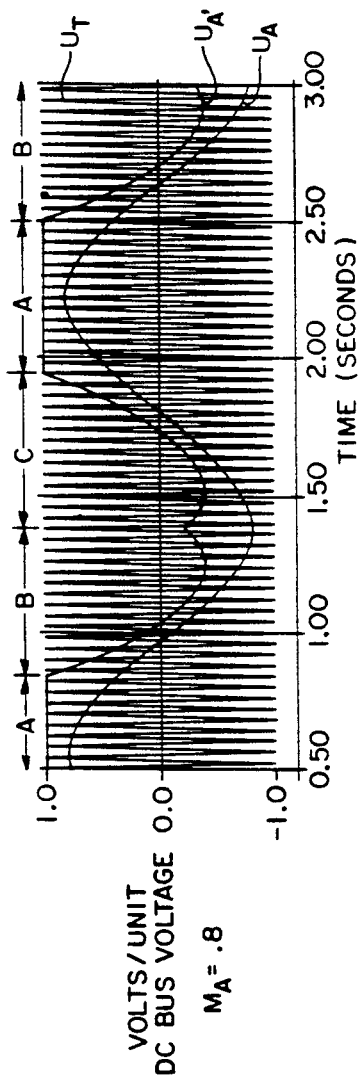
FIG. 6 is a voltage v. time graph showing a reference phase voltage, $U_A$, an augmented reference phase voltage $U_{A'}$, and a triangle signal, UT for $m_A=0.8$.
Figure 9:
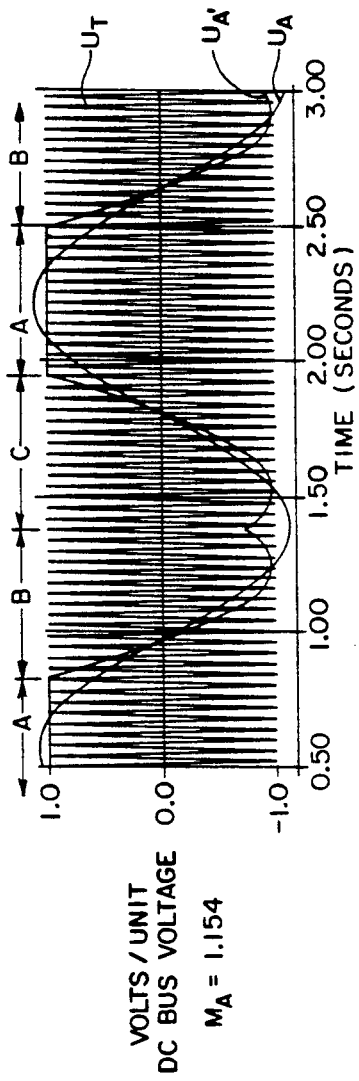
FIGS. 9, 10, 11 are similar to FIGS. 6, 7, and 8, except that $m_A=1.154$.

The arrows in FIG. 2 represent the magnitude and sense of the alteration of $U_A$ and $U_B$ and $U_C$ on lines 2, 4, 6 produced in the summers 8, 10, 12 to achieve $U_{A'}$ and $U_{B'}$ and $U_{C'}$ on lines 41, 43, 45. $U_A$ and $U_{A'}$ are shown in FIGS. 6 and 9.

FIG. 3 is a voltage v. time graph of a difference signal, $U_{DD}$. FIGS. 2 and 3 are on a common time line and $m_A$ is less than 1.

Figure 4:
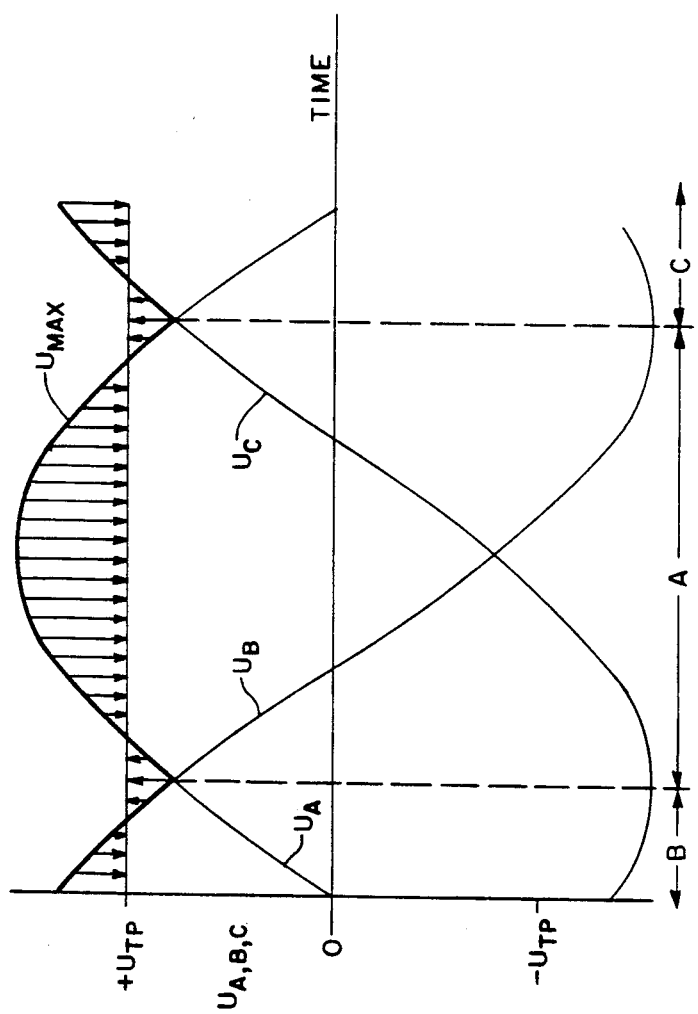
FIG. 4 is a voltage v. time graph of a three-phase sinusoidal voltage, $U_{ABC}$. The amplitude modulation index $m_A$ is greater than 1.

FIG. 4 is a voltage v. time graph of a three-phase sinusoidal voltage, $U_{ABC}$. The amplitude modulation index $m_A$ is greater than 1.

Figure 5:
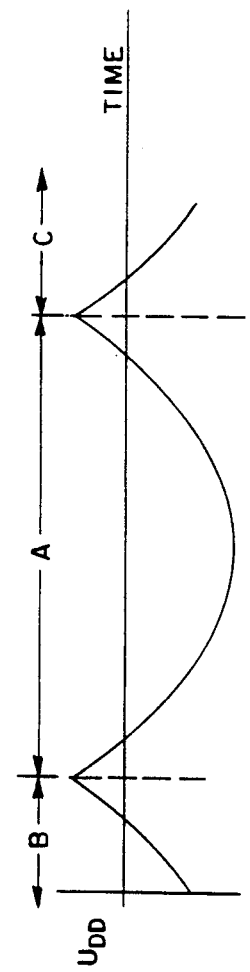
FIG. 5 is a voltage v. time graph of a difference signal, $U_{DD}$.

FIG. 5 is a voltage v. time graph of a difference signal, $U_{DD}$. FIGS. 4 and 5 are on a common time line and $m_A$ is greater than 1.

FIG. 6, on a voltage v. time graph, shows the triangle voltage $U_T$, the reference phase voltage $U_A$, and the augmented reference phase voltage $U_{A'}$. The graphs of $U_A$ and $U_{A'}$ and $U_T$ are similar for the other two reference phase voltages $U_B$ and $U_C$ but shifted 120° and 240°, respectively. The graph of $U_{A'}$ in FIG. 6 is divided into five sections: "A", "B", "C", "A", "B". These sections are analogous to those in FIGS. 2 and 3 where three sections were shown. In the sections labeled "A", $U_A$ is the greatest of the three phase voltages; the addition of $U_{DD}$ causes $U_A$ to be equal to $U_{TP}$ and $U_{SA}$ to be equal to 1. During "A", the switches S1 and S1* in the leg associated with $U_A$ do not open and close with $f_c$. The switch S1 is closed in response to $U_{SA}$ and S1* is open. The complementary switches in legs 2 and 3 may switch at frequency $f_c$ of the triangular voltage U', but not those in leg 1.

In the sections labeled "B", the reference phase voltage $U_B$ is the greatest of the three voltages, and the effect of the addition of $U_{DD}$ on the phase voltage $U_A$, resulting in $U_{A'}$, is shown. The effect on $U_B$ is the same as that upon $U_A$ in section "A". While $U_B$ is the greatest, switch S2 is closed and switch S2* open. The complementary switches in legs 1 and 3 may open and close, but not those in leg 2.

In section "C", the voltage $U_C$ is the greatest of the three phase voltages, and the switch S3, in the leg of the bridge 5 associated with the phase voltage $U_C$, is closed.

The complementary switches in the first and second legs of the bridge 5 are allowed to open and close, but not those in leg 3.

Figure 7:
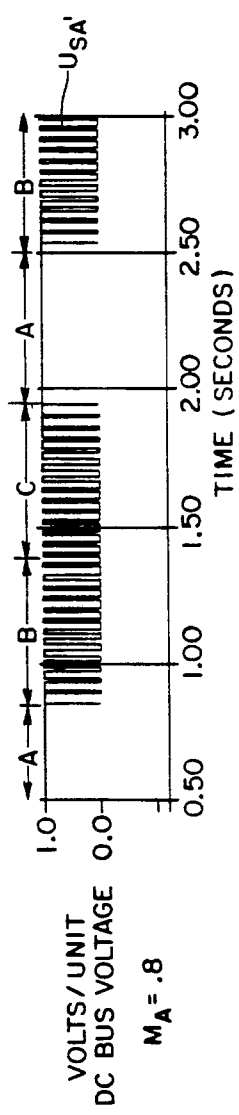
FIG. 7 is a voltage v. time graph of the PWM switching signal, $U_{SA}$ for $m_A=0.8$.
Figure 8:
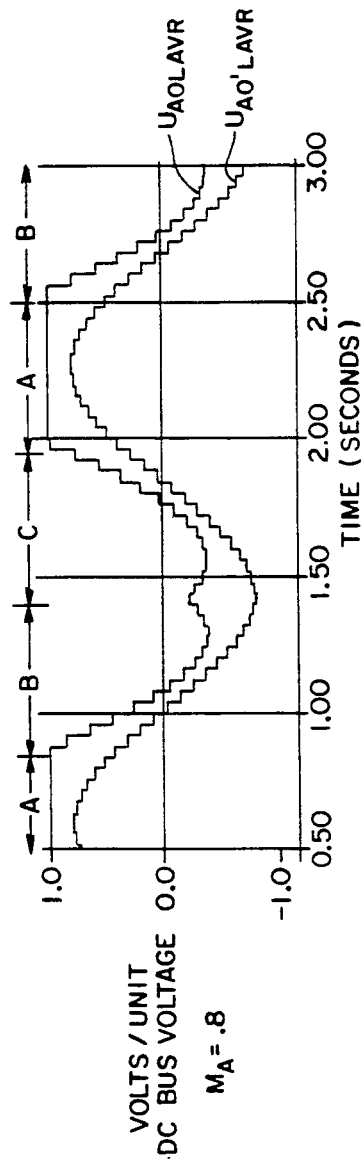
FIG. 8 is a voltage v. time graph of the locally averaged phase voltage $U_{A'OLAVR}$ across load $Z_A$ and the locally averaged phase voltage $U_{AOLAVR}$ for $m_A=0.8$.

FIG. 7 shows the switching signal $U_{SA}$ in a voltage v. time graph on a time line common with FIGS. 6 and 8. While $U_A$ is the largest of the three voltages, switch S1 is always closed and conducting. While phase voltage $U_B$ is the largest of the three, switch S1 and its complement S1* and switches S3 and S3* are switching. Similarly, 120° later, S3 conducts while S1, S1*, S2, and S2* switch.

FIG. 8, on a voltage v. time graph, shows the locally averaged voltage $U_{AOLAVR}$ and the locally averaged load phase voltage $U_{AO'LAVR}$. $U_{AOLAVR}$ is the time-average of voltage between points o and o' in FIG. 1. Prior art PWM circuits would become non-linear in section "A" where the reference voltage $U_A$ exceeds the magnitude of the triangle signal $U_{TP}$. According to the invention, the locally averaged voltage $U_{AOLAVR}$ is non-sinusoidal and does not follow the reference voltage $U_A$ as in the prior art. The line-to-line voltage $U_L$, the difference between any two of non-sinusoidal $U_{AO-LAVR}$, $U_{BOLAVR}$ and $U_{COLAVR}$, remains sinusoidal as long as the amplitudes of the input voltages $U_A$, $U_B$ and $U_C$ remain smaller than $+U_{TP}$ which is fulfilled if the amplitudes of $U_A$ $U_B$ and $U_C$ are smaller than 1.154 * $U_{TP}$. The sinusoidal locally averaged line-to-line voltages provide, in a balanced three-phase load, sinusoidal locally averaged load phase voltages $U_{AO'LAVR}$, $U_{BO'LAVR}$ and $U_{CO'LAVR}$. The amplitude of the non-distorted line-to-line voltage is $U_{DC}$, causing the non-distorted locally averaged phase voltages $U_{AO'LAVR}$, $U_{BO'LAVR}$ and $U_{CO'LAVR}$ to have amplitudes $U_{DC}/\sqrt{3}$ which is 15.4% higher than Udc/2. Udc/2 is the amplitude of locally averaged load phase voltages ($U_{AO'LAVR}=U_{AOLAVR}$; $U_{BO'LAVR}=U_{BOLAVR}$; $U_{CO'LAVR}=U_{COLAVR}$) that can be achieved using triangle comparison methods without RMB 1. Thus the invention extends linearity because $U_{AO'LAVR}$ tracks $U_A$ at a voltage $U_A$ 15.4% higher than in the prior art.

Figure 10:
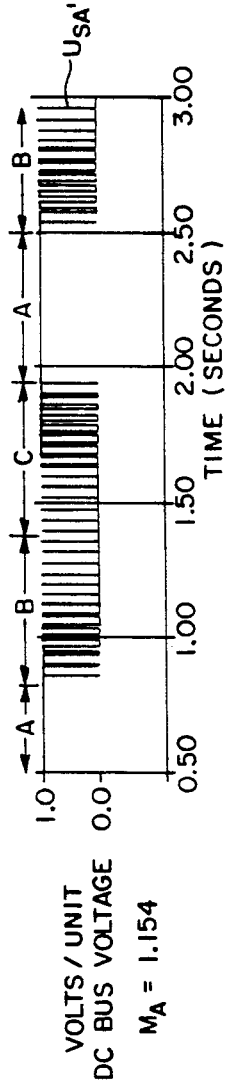
Figure 11:
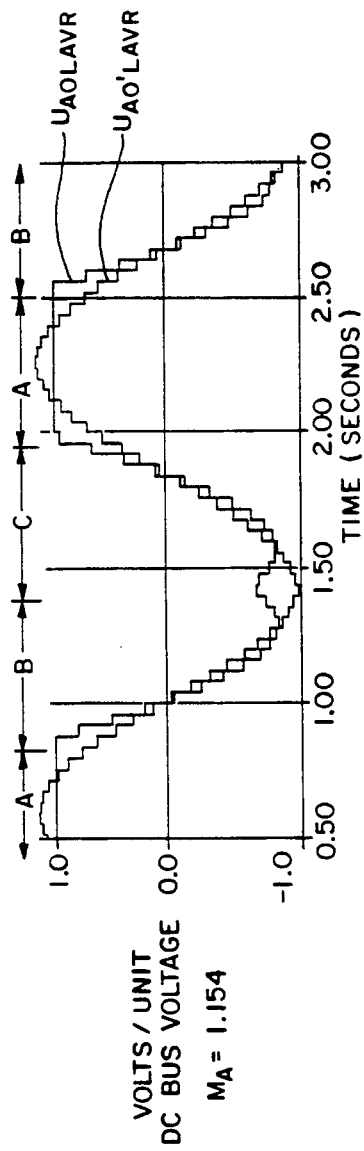

Whereas FIGS. 6, 7, and 8 represent the input/output characteristics where the modulation index $m_A$ is 0.8, FIGS. 9, 10, and 11 show the case where the modulation index $m_A$ is 15.4% higher than 1, equal to 1.154. FIGS. 2 and 3 are to FIGS. 6, 7, and 8, respectively, as FIGS. 4 and 5 are to FIGS. 9, 10, and 11, respectively; for the former five figures $m_A$ is less than 1, while for the latter five figures $m_A$ is greater than 1. Despite the higher reference phase voltage $U_A$ (where $m_A=1.154$), the inverter operation remains linear. FIG. 9 shows that during sections "A", the locally averaged phase voltage $U_{AO'LAVR}$ continues to track the reference $U_A$. Graphs for sections "B" and "C" are similar, but lag "A" by 120° and 240°.

The invention may be implemented in hardware or software. Selection of maximum values of phase voltage references $U_A$ $U_B$ and $U_C$, $U_{MAX}$ and $U_{BIAS}=U_{TP}$ provides continuous conduction of switches S1, S2 and S3 and continuous turnoff of complementary switches S1*, S2* and S3* during periods of time when corresponding voltage references are maximum. Selection of minimum values of references $U_A$ $U_B$ and $U_C$, $U_{MIN}$ and $U_{BIAS}=-U_{TP}$ will provide continuous conduction of switches S1*, S2* and S3* and continuous turn off of switches S1, S2 and S3 during periods of time when corresponding voltage reference are minimum. The same results regarding extended linearity and reduced commutative losses hold for both cases.

Figure 12A:
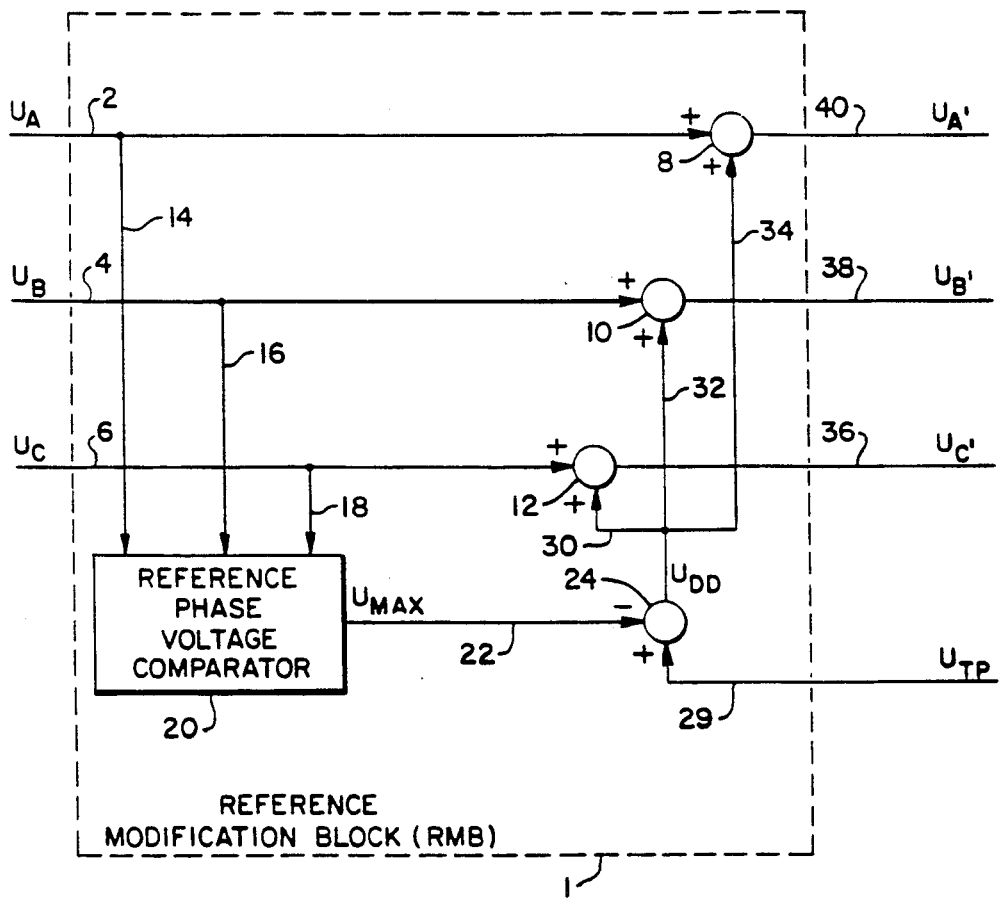
FIGS. 12(a) and 12(b) show a circuit for implementing the invention in a converter circuit.
Figure 12B:
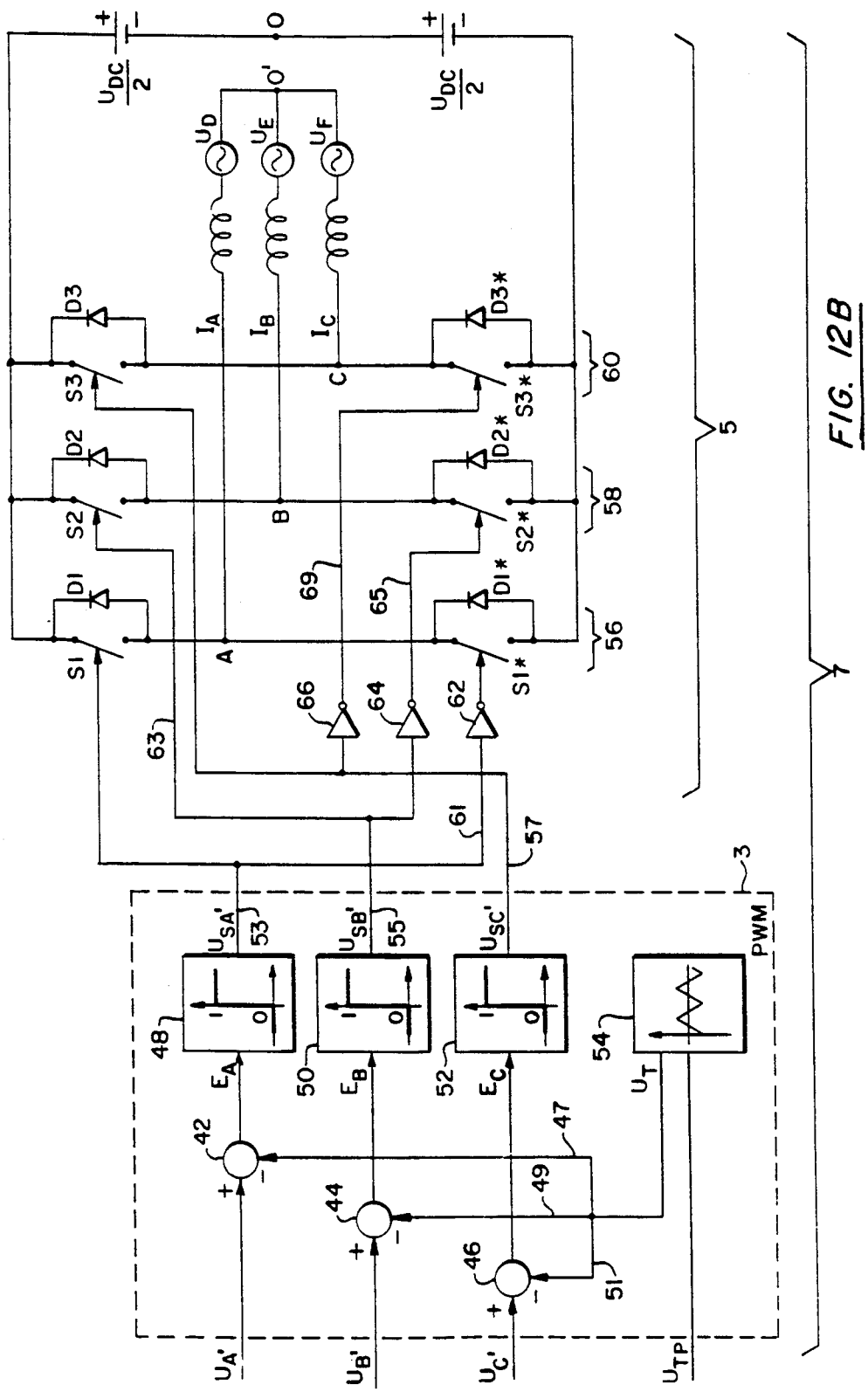

In addition, the bridge comprising the PWM 3 and the bridge 5 may be either for inversion, a constant voltage to alternating voltage transformation or conversion, or alternating voltage to constant voltage transformation. FIG. 1 presents an inverter circuit implementing the invention. If elements 70 are replaced by sinusoidal power voltage sources $U_D$ and $U_E$ and $U_F$ in series with inductors, a converter for implementing the invention is obtained as shown in FIG. 12. Whereas for the inverter circuit the AC voltage output is increased by 15.4%, for the converter with the source DC power output, the AC input voltage is increased over the prior art by the same amount.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

I claim:

1. A method of voltage conversion using a pulse-width-modulator and a bridge, said bridge including at least three legs, each including two complementary switches, comprising the steps:

providing a plurality of sinusoidal reference signals, displaced one from another by a phase angle, one associated with each leg;

detecting a maximum magnitude of said sinusoidal reference signals for providing a maximum reference signal;

subtracting said maximum reference signal from a signal of constant magnitude equal to the amplitude of a triangle carrier signal from said pulse width modulator, for providing a difference signal;

adding said difference signal to said sinusoidal reference signals for providing a plurality of augmented reference signals, one associated with each leg, to said pulse-width-modulator.

2. The method of claim 1, wherein said bridge is used for conversion from alternating voltage to constant voltage.

3. The method of claim 1, wherein said bridge is used for conversion from constant voltage to alternating voltage.

4. A voltage conversion bridge including a pulse-width-modulator (PWM) and a bridge operatively connected to said PWM said bridge including at least three legs, each including two complementary switches, comprising:

means for providing a plurality of sinusoidal reference signals, displaced one from another by a phase angle, one associated with each leg;

detecting means for detecting a maximum magnitude of said sinusoidal reference signals for providing a maximum reference signal;

subtracting means for subtracting said maximum reference signal from a signal of constant magnitude equal to the amplitude of a triangle carrier signal from said pulse width modulator, for providing a difference signal;

a summer for adding said difference signal to said sinusoidal reference signals for providing a plurality of augmented reference signals, one associated with each leg, to said pulse-width-modulator.

5. The voltage conversion bridge of claim 4, wherein said bridge is used for conversion from alternating voltage to constant voltage.

6. The voltage conversion bridge apparatus of claim 4, wherein said bridge is used for conversion from constant voltage to alternating voltage.

* * * * *